UNITED STATES PATENT OFFICE.

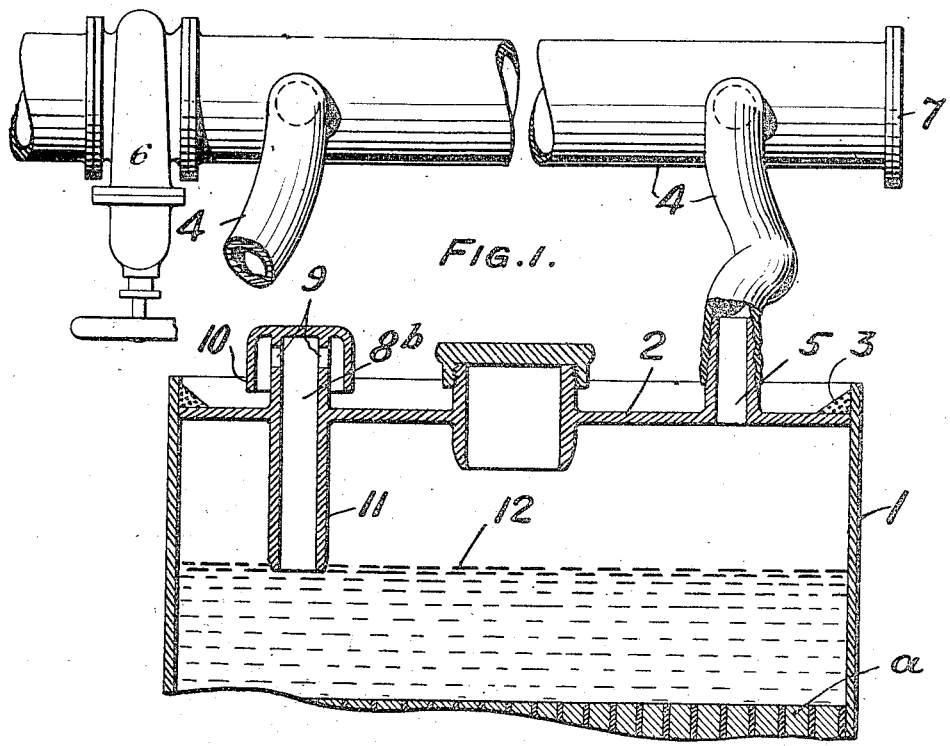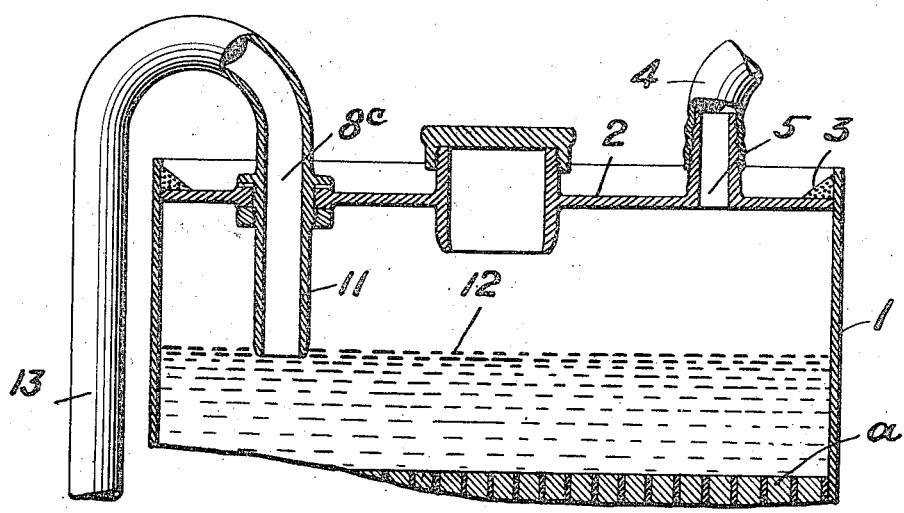

BRUCE FORD, OF PHILADELPHIA, PENNSYLVANIA.

SECONDARY OR STORAGE BATTERY.

1,210,787. Specification of Letters Patent. Patented Jan. 2, 1917.

Application filed April 22, 1915. Serial No. 23,010.

*To all whom it may concern:*

Be it known that I, BRUCE FORD, a citizen of the United States, and a resident of Philadelphia, in the county of Philadelphia and State of Pennsylvania, have invented certain new and useful Improvements in Secondary or Storage Batteries, of which the following is a specification.

Storage batteries when applied to boats, for example to submarine boats, are sometimes through accident or otherwise flooded with salt water and it is undesirable to have salt water get into the battery jars or containers.

The principal object of the present invention is to provide for properly ventilating the storage battery jars or containers while at the same time providing an effective seal or trap for preventing or opposing the entry of sea water into the jar or container through the air inlet.

The invention stated in general terms comprises the combination with the air inlet of a storage battery jar or container of a trap adapted to seal in connection with the electrolyte as well as with the flood of sea water.

The invention further comprises the improvements to be presently described and finally claimed.

In the drawings, Figure 1 is a view, partly in section, illustrating a part of a storage battery provided with a trap embodying features of the invention, and Fig. 2, is a similar view illustrating a modification.

In the drawings 1 is a storage battery jar or container closed by a cover 2, sealed as at 3.

$a$ are plates and 12 indicates the level of the electrolyte.

$8^b$ and $8^c$ indicate the opening through the cover by which air is introduced into the interior of the jar or container.

4, is an exhaust connection that communicates as at 5 with the interior of the jar or container and it is provided with means, such as a valve indicated at 6, for rendering it ineffective. The valve is of course an example of means for rendering the exhaust connection ineffective and there are exhausters which are ineffective when at rest and prevent the passage of anything through them. Several exhaust connections 4 are shown because there is usually one for each jar or container and a cap 7 is shown to convey the idea that additional extensions can be employed.

Referring to Fig. 1, the sea water trap comprises the tube 11 that dips below the level 12 of the electrolyte and the outwardly extending tube $8^b$ provided with the openings 9 and with the skirt 10.

As shown in Fig. 2, the trap consists of the tube 11 as before and the outwardly extending tube $8^c$ provided with a goose-neck 13 that may project downward as far as required.

In the normal operation of the battery air enters past the trap through the tube 11, bubbling up through the electrolyte and escapes along with the gases generated in the battery through the exhauster. In case of an accident which wholly or partially submerges the jars or containers, the exhauster is rendered ineffective as by closing the valve 6 so that air and gases may not escape from the interior of the jar or container by way of the exhauster. To the extent that air or gases are confined in the jar or container the entry of sea water is opposed. The described traps operate to prevent the escape of air or gases from the interior of the jar or container and hence oppose the entry of sea water. They do this in two ways. The sea water seals the end of the tube 13 or cap 10 and the electrolyte seals the end of the tube 11. The action of the traps in thus preventing the escape of air and gases is positive and the only manual or like operation is that of closing the valve 6.

What I claim is:

1. The combination in a storage battery of an air inlet, and a trap for said inlet having two sealing portions one inside and the other outside the jar or container.

2. In a storage battery the combination of a sealed jar or container having an air inlet, a trap tube extending inward from the air inlet, and a tube extending outward from the air inlet and provided with a cap projecting below its outward orifice.

3. In a storage battery the combination of a closed jar or container, an exhauster connected therewith, means for rendering the exhauster ineffective, and a trap arranged inside and outside of the jar or container, substantially as described.

4. The combination in a storage battery of a plurality of cells each having an air inlet provided with a tube extending downward and terminating in the electrolyte below the surface thereof to constitute liquid seals, an exhaust system common to all said cells, and means for rendering the exhaust system ineffective on all the cells, substantially as described.

In testimony whereof I have hereunto signed my name.

BRUCE FORD.

Witnesses:
 GEO. M. HOWARD,
 WISTAR ETALLERSON.